United States Patent
Wang et al.

(10) Patent No.: US 9,465,252 B2
(45) Date of Patent: Oct. 11, 2016

(54) DUAL-MODE LIQUID CRYSTAL DISPLAY DEVICE, COLOR FILTER SUBSTRATE AND ARRAY SUBSTRATE

(71) Applicant: BOE TECHNOLOGY GROUP CO., LTD., Beijing (CN)

(72) Inventors: Lu Wang, Beijing (CN); Shiming Shi, Beijing (CN); Yanliu Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 14/363,084

(22) PCT Filed: Jun. 13, 2013

(86) PCT No.: PCT/CN2013/077172
§ 371 (c)(1),
(2) Date: Jun. 5, 2014

(87) PCT Pub. No.: WO2014/153849
PCT Pub. Date: Oct. 2, 2014

(65) Prior Publication Data
US 2015/0286095 A1    Oct. 8, 2015

(30) Foreign Application Priority Data
Mar. 29, 2013    (CN) .......................... 2013 1 0108948

(51) Int. Cl.
G02F 1/133    (2006.01)
G02F 1/1335   (2006.01)
F21V 8/00     (2006.01)
G02F 1/1368   (2006.01)

(52) U.S. Cl.
CPC ....... *G02F 1/133617* (2013.01); *G02B 6/0068* (2013.01); *G02F 1/1368* (2013.01); *G02F 1/133514* (2013.01); *G02F 1/133528* (2013.01)

(58) Field of Classification Search
CPC .......... G02B 6/0068; G02F 1/133617; G02F 1/1368; G02F 1/133528; G02F 1/133514
See application file for complete search history.

(56) References Cited

U.S. PATENT DOCUMENTS

| 7,782,422 B2 | 8/2010 | Cho et al. |
| 8,233,118 B2 | 7/2012 | Li et al. |

(Continued)

FOREIGN PATENT DOCUMENTS

| CN | 101493602 A | 7/2009 |
| CN | 101493602 B | 5/2011 |

(Continued)

OTHER PUBLICATIONS

English translation of the International Preliminary Report on Patentability and Written Opinion of the International Searching Authority of PCT/CN2013/077172, issued Sep. 29, 2015.

(Continued)

*Primary Examiner* — James Dudek
(74) *Attorney, Agent, or Firm* — Collard & Roe, P.C.

(57) ABSTRACT

A dual-mode liquid crystal display device, a color filter substrate and an array substrate are provided. The display device comprises: a color filter substrate (10), an array substrate (20) assembled with the color filter substrate (10), and a liquid crystal layer (30) between the color filter substrate (10) and the array substrate (20). The pixel area of the array substrate (20) comprises red, green, blue and white sub-pixels; and the color filter substrate (10) or the array substrate (20) is provided with a fluorescent layer at the position corresponding to the white sub-pixels.

8 Claims, 4 Drawing Sheets

(56) References Cited

U.S. PATENT DOCUMENTS

| | | | |
|---|---|---|---|
| 2006/0146229 A1 | 7/2006 | Cho et al. | |
| 2007/0146584 A1* | 6/2007 | Wang | G02B 5/201 349/106 |
| 2011/0255303 A1* | 10/2011 | Nichol | G02B 6/006 362/606 |
| 2013/0258258 A1* | 10/2013 | Nakamura | G02B 5/201 349/106 |

FOREIGN PATENT DOCUMENTS

| | | |
|---|---|---|
| CN | 102654684 A | 9/2012 |
| CN | 102707487 A | 10/2012 |
| CN | 102998858 A | 3/2013 |
| JP | 2011237701 A | 11/2011 |

OTHER PUBLICATIONS

Chinese Patent Certificate of Chinese Application No. 201310108948.4 issued Nov. 18, 2016.
Second Chinese Office Action of Chinese Application No. 201310108948.4, mailed May 18, 2015 with English translation.
Chinese Office Action of Chinese Application No. 201310108948.4, mailed Dec. 31, 2014 with English translation.
English Translation of the International Search Report of PCT/CN2013/077172, mailed Jan. 2, 2014.
International Search Report, International Preliminary Report on Patentability and Written Opinion of the International Searching Authority of PCT/CN2013/077172 in Chinese, mailed Jan. 2, 2014.

* cited by examiner

DUAL-MODE LIQUID CRYSTAL DISPLAY DEVICE, COLOR FILTER SUBSTRATE AND ARRAY SUBSTRATE

CROSS REFERENCE TO RELATED APPLICATIONS

This application is the National Stage of PCT/CN2013/077172 filed on Jun. 13, 2013, which claims priority under 35 U.S.C. §119 of Chinese Application No. 201310108948.4 filed on Mar. 29, 2013, the disclosure of which is incorporated by reference.

TECHNICAL FIELD

Embodiments of the present invention relate to a dual-mode liquid crystal display device, a color filter substrate and an array substrate.

BACKGROUND

Currently liquid crystal display devices need to be available day and night when used in some special fields, and normal display functions of a color LCD can be achieved when used in the day, while the brightness of the display needs to be lowered when used in the night, as long as it is ensured that a user can clearly see displayed contents. In view of such specific use requirements, a display screen having two display modes is desired.

SUMMARY

One of the technical problems to be solved by the embodiments of the present invention is to provide a dual-mode liquid crystal display device, a color filter substrate and an array substrate, which can provide a dual-mode display mode in a bright environment and a dark environment, and then meet users' needs.

An embodiment of the invention provides a dual-mode liquid crystal display device, comprising: a color filter substrate, an array substrate cell-assembled with the color filter substrate, and a liquid crystal layer between the color filter substrate and the array substrate; wherein, the array substrate has a pixel area comprising red, green, blue and white sub-pixels; and the color filter substrate or the array substrate is provided with a fluorescent layer at a position corresponding to the white sub-pixel.

In one example, a polarizer is provided on a surface of the color filter substrate opposite to the liquid crystal layer, and the fluorescent layer is provided on the polarizer at the position corresponding to the white sub-pixel.

In one example, light filter films of corresponding colors are provided on a surface of the color filter substrate close to the liquid crystal layer at positions corresponding to the red, green and blue sub-pixels.

In one example, the fluorescent layer is provided on the array substrate in a TFT pixel area corresponding to the white sub-pixel.

In one example, the dual-mode liquid crystal display device further comprises: a backlight source and a light guide plate provided at a side of the array substrate opposite to the liquid crystal layer, and the backlight source comprises: a white light source and an ultraviolet band light source which are separately controlled through switches independent of each other.

In one example, a lower polarizer is provided on a surface of the array substrate close to the backlight source and the light guide plate.

In one example, the red, green, blue and white sub-pixels are arranged parallel to each other or to be a matrix.

Another embodiment of the invention provides a color filter substrate, comprising: light filter areas of red, green, blue and white sub-pixels; wherein, the color filter substrate is provided with a fluorescent layer at a position corresponding to the white sub-pixel.

In one example, light filter films of corresponding colors are provided on a surface of the color filter substrate at positions corresponding to the light filter areas of the red, green and blue sub-pixels.

In one example, a polarizer is provided on a side of the color filter substrate opposite to the surface where the light filter films are provided, and the fluorescent layer is provided on the polarizer at the position corresponding to the white sub-pixel.

Still another embodiment provides an array substrate, comprising red, green, blue and white sub-pixels; wherein, the array substrate is provided with a fluorescent layer at a position corresponding to the white sub-pixel.

In one example, the fluorescent layer is provided at a position of the array substrate corresponding to a TFT pixel area of the white sub-pixel.

In one example, the red, green, blue and white sub-pixels are arranged parallel to each other or to be a matrix.

In the above solutions, through adding a transmissive sub-pixel, that is, the above white sub-pixels, the light emitted from the backlight source is transmitted to the fluorescent layer in front of a display screen, and the fluorescent layer is excited to emit light, then fluorescent display in a dark environment is achieved and user's needs are met.

BRIEF DESCRIPTION OF THE DRAWINGS

In order to more clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical solutions and advantages of the embodiments of the invention more apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The embodiments of the present invention provide a dual-mode liquid crystal display device, comprising: a color filter substrate 10, an array substrate 20 cell-assembled with the color filter substrate 10, and a liquid crystal layer 30 provided between the color filter substrate 10 and the array substrate 20, and the pixel area of the array substrate 20 comprises red, green, blue and white sub-pixels; and the color filter substrate 10 or the array substrate 20 is provided with a fluorescent layer 12 at the position corresponding to the white sub-pixels.

Figure 1:
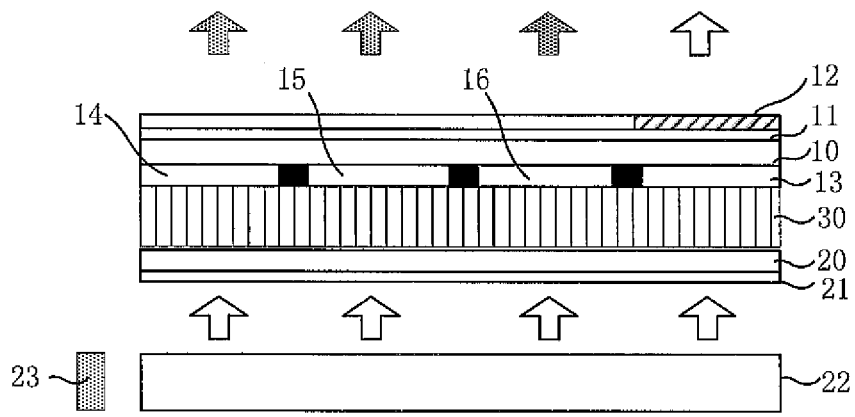
FIG. 1 is a structure diagram of the dual-mode liquid crystal display device of the embodiments of the present invention and a schematic diagram of the display in a bright environment of pixel design embodiment 1.
Figure 2:
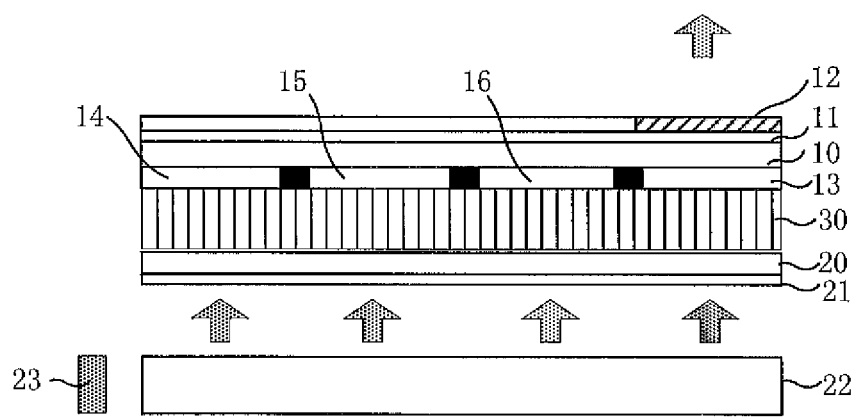
FIG. 2 is a structure diagram of the dual-mode liquid crystal display device of the embodiments of the present invention and a schematic diagram of the display in a dark environment of pixel design embodiment 1.

FIGS. 1 and 2 are schematic diagrams of the structure of the first specific embodiment of the above dual-mode liquid crystal display device, as illustrated in FIGS. 1 and 2, the fluorescent layer 12 is provided at the outer surface of the upper polarizer 11 on the color filter substrate 10 corresponding to the projection position of the white sub-pixels. The color filter substrate 10 is provided with light filter films 14, 15, 16 of corresponding colors on its surface close to the liquid crystal layer at positions corresponding to the red, green and blue sub-pixels. That is to say, the upper polarizer 11 is provided on the surface of the color filter substrate 10 opposite to the liquid crystal layer, and the fluorescent layer 12 is provided at the position of the polarizer 11 corresponding to the white sub-pixels.

In the first embodiment, the dual-mode liquid crystal display device further comprises: a backlight source 23 and a light guide plate 22 provided below the array substrate 20, and the backlight source 23 comprises: a white light source and an ultraviolet band light source which are separately controlled through switches independent of each other. In addition, the array substrate 20 is further provided with a lower polarizer 21 at the surface close to the backlight source 23 and the light guide plate 22.

For example, the processes that the above dual-mode liquid crystal display device achieves displaying in a bright environment and in a dark environment are as follow:

As illustrated in FIG. 1, it is a schematic diagram of display in the bright environment, the backlight source is turned on, in a normal mode or bright environment mode, the ultraviolet band light source is turned off, a white light source is turned on, normal red, green, blue and white display can be achieved, as illustrated in FIG. 1, it is a schematic diagram illustrating the travelling of the light and display.

As illustrated in FIG. 2, it is a schematic diagram of display in the dark environment, in a fluorescent mode or dark environment mode, a white backlight source is turned off, the ultraviolet band light source is turned on, after the ultraviolet light is irradiated to the fluorescent layer, it can emit fluorescent light and then fluorescent display can be achieved. Therefore, the object of dual-mode liquid crystal display is achieved, and user's needs are met.

Figure 3:
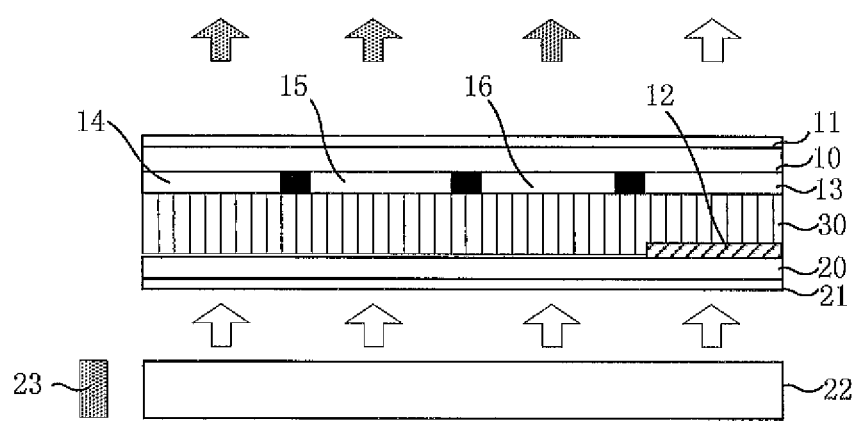
FIG. 3 is a structure diagram of the dual-mode liquid crystal display device of the embodiments of the present invention and a schematic diagram of the display in a bright environment of pixel design embodiment 2.
Figure 4:
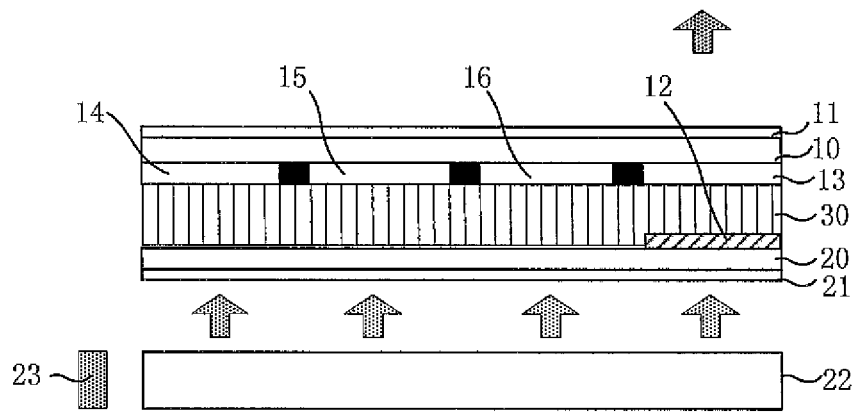
FIG. 4 is a structure diagram of the dual-mode liquid crystal display device of the embodiments of the present invention and a schematic diagram of the display in a dark environment of pixel design embodiment 2.

FIGS. 3 and 4 are structural schematic diagrams of the second embodiment of dual-mode liquid crystal display device of the embodiments of the present invention, in the second embodiment, the array substrate 20 is provided with a fluorescent layer 12 in a TFT pixel area corresponding to the white sub-pixels; that is, the fluorescent layer is provided within the LCD, and fluorescent display of the dark environment can also be achieved.

In this embodiment, the above dual-mode liquid crystal display device can further comprise: a backlight source 23 and a light guide plate 22 provided below the array substrate 20, and the backlight source 23 comprises: a white light source and an ultraviolet band light source which are separately controlled through switches independent of each other.

Furthermore, the array substrate 20 is further provided with a lower polarizer 21 at the surface close to the backlight source 23 and the light guide plate 22.

As illustrated in FIG. 3, the fluorescent layer is fabricated on a TFT substrate, and the light filter film of a fluorescent material is coated to TFT pixel area corresponding to the white sub-pixels. The ultraviolet light forms polarized ultraviolet light through the lower polarizer 21, and the polarized ultraviolet light excites the fluorescent material to emit visible light with a certain polarization direction, then fluorescent display output can be achieved through applying a voltage to the pixels and the effect of the liquid crystal in the cell.

In addition, it needs to be indicated that in the first embodiment and in the second embodiment, the red, green, blue and white sub-pixels are arranged parallel to each other or to be a matrix.

Figure 6:
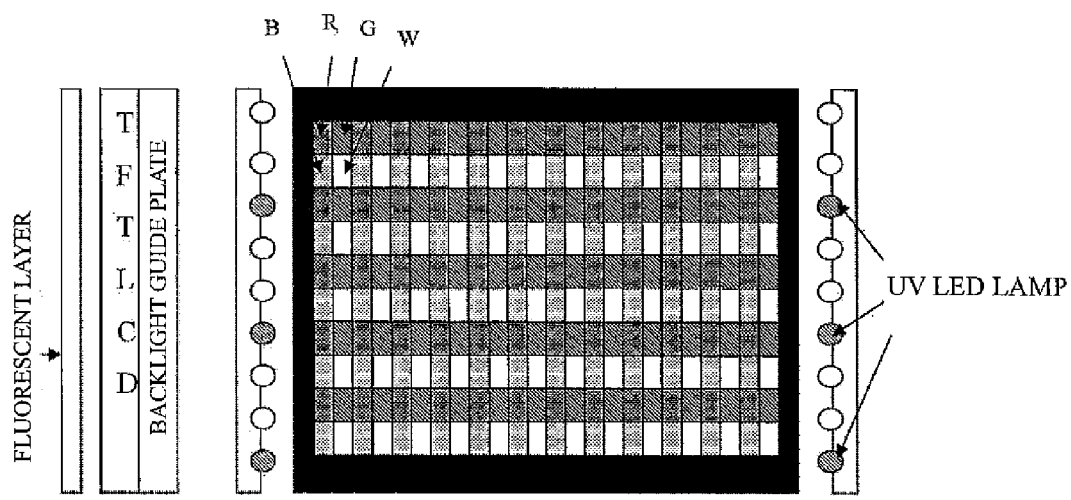
FIG. 6 is a planar schematic diagram of the dual-mode liquid crystal display device of the embodiments of the present invention.
Figure 7:
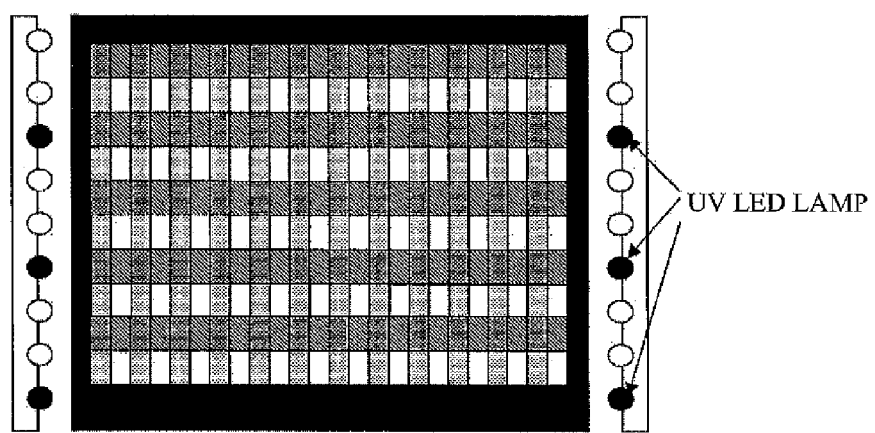
FIG. 7 is a planar schematic diagram of the dual-mode liquid crystal display device of the embodiments of the present invention in a bright environment.
Figure 8:
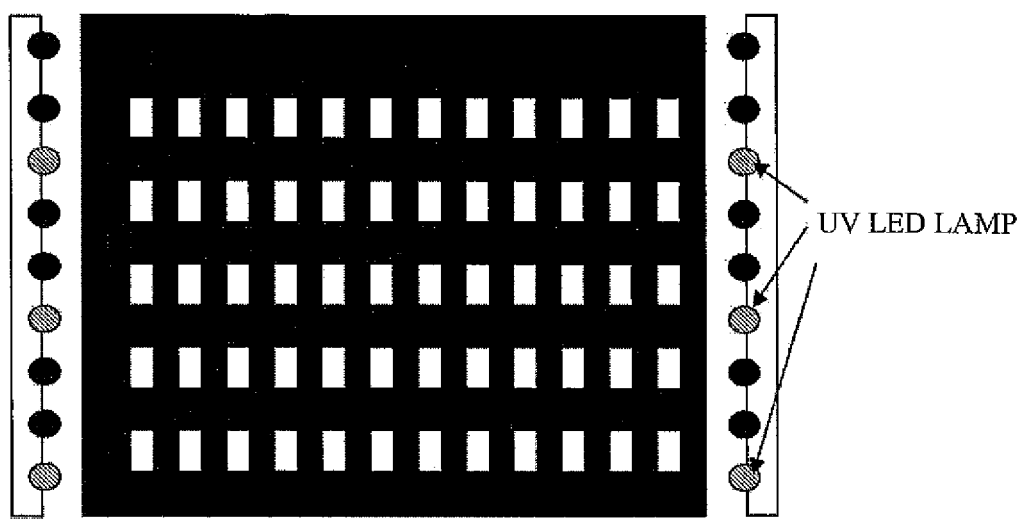
FIG. 8 is a planar schematic diagram of the dual-mode liquid crystal display device of the embodiments of the present invention in a dark environment.

FIG. 6 is a planar schematic diagram of the matrix arrangement of the red, green, blue and white sub-pixels of the above embodiments; FIG. 7 is a schematic diagram of the display in a bright environment of the dual-mode liquid crystal display device illustrated in FIG. 6; and FIG. 8 is a schematic diagram of the display in a dark environment of the dual-mode liquid crystal display device illustrated in FIG. 6.

Figure 5:
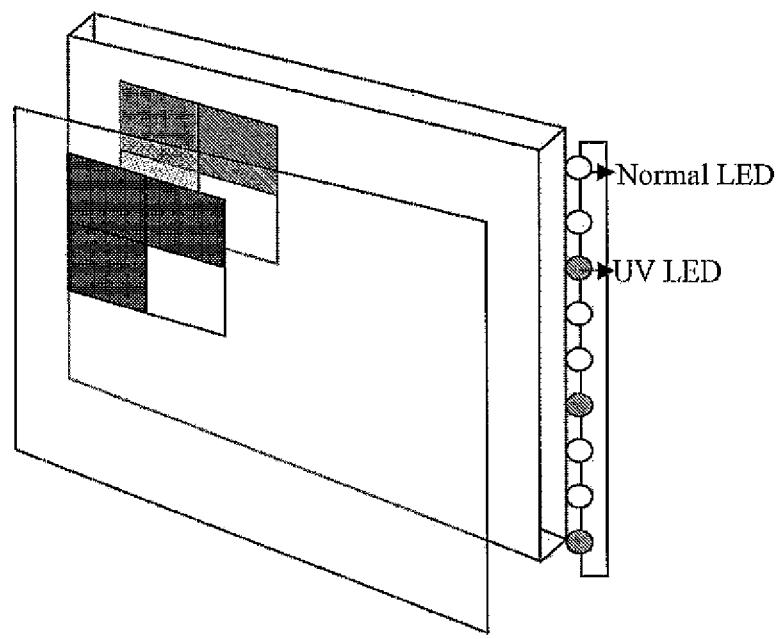
FIG. 5 is a schematic diagram of the perspective structure of the dual-mode liquid crystal display device of the embodiments of the present invention.

FIG. 5 is a schematic diagram of the perspective structure of the above embodiments of the present invention, wherein, the red, green, blue and white sub-pixels are also arranged to be a matrix.

In the above embodiments of the present invention, light filter films of corresponding colors are coated on the color filter substrate corresponding to the red, green and blue sub-pixels, and no light filter film is provided on the position of the white sub-pixels. While the color filter substrate is adhered with a fluorescent layer at its outer side at the projection position of the white sub-pixels, or the array substrate is provided with a fluorescent material at the position corresponding to the white sub-pixels; and the fluorescent layer can be formed at a sub-pixel position corresponding to it in a way of exposure, and the backlight source further comprises a light source of ultraviolet band besides the light source of the white visible light band, and can independently control the white light source and the ultraviolet light source, respectively. A normal color LCD display mode is used under daylight and in a bright environment, and is switched to a UV backlight mode in a dark environment, and the fluorescent layer can achieve fluorescent display after the ultraviolet light transmits the white sub-pixels and is irradiated to the fluorescent layer.

In addition, in the design of the backlight source, a UV LED lamp can be added in an LED lamp bar, and the added ratio is so determined as to ensure that the UV can excite the fluorescent layer. The UV LED lamp can be arranged independent of a normal LED lamp bar, i.e., arranged independently. It can be arranged at the upper and lower sides of the LED lamp bar. In addition, the above backlight source for exciting the fluorescent layer to emit light in the embodiments of the present invention is the UV LED lamp while is not limited to the UV LED lamp, and other light sources that can be used to excite the fluorescent layer to emit light can be used in the above dual-mode liquid crystal display device of the embodiments of the present invention.

In addition, as illustrated in FIGS. 1 and 2, the embodiments of the present invention further provide a color filter substrate 10, which comprises light filter areas 14, 15, 16 and 13 of red, green, blue and white sub-pixels at the surface close to the liquid crystal layer; and the color filter substrate is provided with a fluorescent layer 12 at the position corresponding to the white sub-pixels 13.

The fluorescent layer 12 is provided at the outer surface of the upper polarizer 11 on the color filter substrate corresponding to the projection position of the white sub-pixels 13.

The color filter substrate is provided with light filter films 14, 15, 16 of corresponding colors on its surface close to the liquid crystal layer at positions corresponding to the light filter areas of the red, green and blue sub-pixels.

As illustrated in FIGS. 3 and 4, the embodiments of the present invention further provide an array substrate 20, and the pixel area of the array substrate comprises red, green, blue and white sub-pixels; and the array substrate is provided with the fluorescent layer 12 at the position corresponding to the white sub-pixels.

The fluorescent layer is provided at the position of the array substrate corresponding to a TFT pixel area of the white sub-pixels.

The red, green, blue and white sub-pixels are arranged parallel to each other or to be a matrix.

Described above are just exemplary ones of the present invention, and are not intended to limit the scope of protection of the invention. The scope of protection of the present invention shall be defined by the appended claims.

The invention claimed is:

1. A dual-mode liquid crystal display device, comprising: a color filter substrate, an array substrate cell-assembled with the color filter substrate, and a liquid crystal layer between the color filter substrate and the array substrate; wherein,
the array substrate has a pixel area comprising red, green, blue and white sub-pixels; and
the color filter substrate or the array substrate is provided with a fluorescent layer at a position corresponding to the white sub-pixel,
wherein the fluorescent layer is provided on at least one of:
(a) the array substrate in a TFT pixel area corresponding to the white sub-pixel;
b) a polarizer, which is provided on a surface of the color filter substrate opposite to the liquid crystal layer, at the position corresponding to the white sub-pixel.

2. The dual-mode liquid crystal display device according to claim 1, wherein, light filter films of corresponding colors are provided on a surface of the color filter substrate close to the liquid crystal layer at positions corresponding to the red, green and blue sub-pixels.

3. The dual-mode liquid crystal display device according to claim 1, wherein, the dual-mode liquid crystal display device further comprises: a backlight source and a light guide plate provided at a side of the array substrate opposite to the liquid crystal layer, and the backlight source comprises: a white light source and an ultraviolet band light source which are separately controlled through switches independent of each other.

4. The dual-mode liquid crystal display device according to claim 3, wherein, a lower polarizer is provided on a surface of the array substrate close to the backlight source and the light guide plate.

5. The dual-mode liquid crystal display device according to claim 1, wherein, the red, green, blue and white sub-pixels are arranged parallel to each other or to be a matrix.

6. A color filter substrate, comprising:
light filter areas of red, green, blue and white sub-pixels; wherein, the color filter substrate is provided with a fluorescent layer at a position corresponding to the white sub-pixel; and
light filter films of corresponding colors provided on a surface of the color filter substrate at positions corresponding to the light filter areas of the red, green and blue sub-pixels;
wherein, a polarizer is provided on a side of the color filter substrate opposite to the surface where the light filter films are provided, and the fluorescent layer is provided on the polarizer at the position corresponding to the white sub-pixel.

7. The dual-mode liquid crystal display device according to claim 2, wherein, the dual-mode liquid crystal display device further comprises: a backlight source and a light guide plate provided at a side of the array substrate opposite to the liquid crystal layer, and the backlight source comprises: a white light source and an ultraviolet band light source which are separately controlled through switches independent of each other.

8. The dual-mode liquid crystal display device according to claim 2, wherein, the red, green, blue and white sub-pixels are arranged parallel to each other or to be a matrix.

* * * * *